United States Patent [19]

Stolz

[11] Patent Number: 4,566,531
[45] Date of Patent: Jan. 28, 1986

[54] VEHICLE AIR CONDITIONING ARRANGEMENT

[75] Inventor: Albert Stolz, Tübingen, Fed. Rep. of Germany

[73] Assignee: Daimler-Benz Aktiengesellschaft, Stuttgart, Fed. Rep. of Germany

[21] Appl. No.: 539,139

[22] Filed: Oct. 5, 1983

[30] Foreign Application Priority Data

Oct. 8, 1982 [DE] Fed. Rep. of Germany ....... 3237275

[51] Int. Cl.$^4$ .......................... B60H 1/12; F25B 29/00
[52] U.S. Cl. ........................................ 165/42; 62/244; 62/325
[58] Field of Search .................. 165/42, 43; 62/323.1, 62/325, 244

[56] References Cited

U.S. PATENT DOCUMENTS

| | | | |
|---|---|---|---|
| 2,391,151 | 12/1945 | Gibson | 62/325 |
| 2,481,348 | 9/1949 | Ringquist et al. | 62/325 X |
| 2,751,758 | 6/1956 | Parrish | 62/325 X |
| 2,780,077 | 2/1957 | Jacobs | 62/325 X |
| 2,984,087 | 5/1961 | Folsom | 62/325 |
| 3,143,864 | 8/1964 | Schordine | 62/325 |
| 3,834,451 | 9/1974 | Kozinski | 165/43 X |
| 4,072,186 | 2/1978 | Barton | 165/43 |

FOREIGN PATENT DOCUMENTS

| | | | |
|---|---|---|---|
| 2502762 | 10/1982 | France | 62/325 |
| 110841 | 8/1980 | Japan | 62/325 |

Primary Examiner—Sheldon J. Richter
Attorney, Agent, or Firm—Barnes & Thornburg

[57] ABSTRACT

A vehicle air conditioning, heating and air circulation system is provided for a vehicle utility space. A condensor and evaporator of a vehicle compressed-air air-conditioning system are arranged respectively in the inflow and outflow air channels for the vehicle space. A heat exchanger cycle of a vehicle water or oil engine cooling heat exchanger system is disposed in the inflow air channel. A pivotal flap is disposed intermediate the inflow and outflow channels to selectively control the flow of air.

17 Claims, 4 Drawing Figures

VEHICLE AIR CONDITIONING ARRANGEMENT

BACKGROUND AND SUMMARY OF THE INVENTION

This invention relates to a system for the heating, ventilating and cooling of a passenger and/or utility space of vehicles. The system is of the type having a heat exchanger connected to a cycle that takes up the heat of an internal-combustion engine for the heating of the vehicle, as well as a condenser and an evaporator which are part of a compression-type air-conditioning unit. During the cooling, the fresh air, after flowing through the condenser and the heat exchanger, is led into the open air or atmosphere, whereas, during the heating or ventilating operation, the fresh air enters the passenger and/or utility space as ingoing air.

A system of this general type, as used in a motor vehicle equipped with a Stirling engine, is known from German Published Unexamined Application (DE-OS) No. 27 12 178, where, for the removal of the occurring large volume of heat, the heating air exchanger is switched on continuously.

However, in the case of conventional internal-combustion engines, the heating of passenger and useful spaces has become increasingly difficult. Because of their continually more effective or efficient operation and because of the decreasing output requirement of the vehicles for reasons of reduction of the rolling or air resistance as well as of mass, the heat to be removed via a cooling cycle becomes progressively less, and therefore less heat is available for the heating cycle. The trend in this direction is also increased by the fact that the progressively more functional motor vehicles are used at continuously lower outside temperatures.

Since the heat requirement is determined mainly by the quantity of heat of the outgoing air flowing with the outgoing air out of the passenger and/or utility space, it was contemplated to add a changeable proportion of circulating air to the heated ingoing air so that the proportion of outside air having a low temperature will decrease. However, this is possible only to a limited extent because otherwise the relative humidity, because of the reduced flow of outgoing air, will increase so much that a visibility-impairing fogging or icing will occur on the cold windows. In addition, it is absolutely necessary for the well-being of the passengers and the driver that a frequent renewal of air takes place by means of a correspondingly high portion of fresh air.

In order to remedy this situation, it has been contemplated to install additional heaters which, however, apart from the additional energy, also require additional space for the housing of the required aggregate and the necessary pipes.

While not requiring an additional heater in vehicles, it is an object of the invention to achieve, in vehicles which have a compressor-type air-conditioning unit in addition to a heat exchanger connected to the cooling cycle of the internal-combustion engine for the heating operation, an improvement of the heat output with the lower expenditures and without restricting the operational capacity of the system in the normal case. This object is achieved according to the invention by utilizing the heat energy of the outgoing air while avoiding the disadvantages of the operation with a high proportion of circulating air.

According to preferred embodiments of the invention, a system for the heating, ventilating and cooling of the initially described type is provided where the evaporator is arranged in the flow of outgoing air of the passenger and/or utility space and this flow, by means of at least one adjusting device, is directed in such a way that, during a cooling operation, it is again led as ingoing air into the passenger and/or utility space, whereas in the case of a heating or ventilating operation, the outgoing air flow will go out into the atmosphere. Further, according to the counter-flow principle, during the cooling operation, the occurring fresh air, after flowing through the condenser and the heat exchanger, will be led into the open air, whereas, in the case of a heating or ventilating operation, the fresh air, as ingoing air, will enter the passenger and/or utility space, and where, moreover, in order to achieve a maximum heating output, the air-conditioning unit can be activated and then the energy content withdrawn from the outgoing air in the evaporator, via the condenser, is directly or indirectly, in order to aid the heating, again discharged in the ingoing air and is led in front of the heat exchanger connected to the heating cycle.

On the basis of U.S. Pat. No. 2,801,827, it is known, by utilizing the cooling cycle of an air-conditioning unit, to let off the heat energy taken up via an evaporator on the side of the condenser and to use it for the heating of the vehicle. However, this heating system is the only source of heat. In addition, the system must have two reversable cooling cycles with a total of three heat exchangers, in which case one heat exchanger operates as a condenser or evaporator.

A high flow rate of air can be obtained according to preferred embodiments of the invention when, in addition to a connectable fan taking in fresh air, another fan is provided that increases the flow of outgoing or circulating air which, in addition to the cooling and drying operation, is also in use during an extensive heating and ventilating operation.

In a preferred embodiment of the invention, during the cooling operation, an amount of fresh air that maintains a certain internal pressure level is led to the intake side of the fan returning circulating air, via a pipe connected to the atmosphere, resulting at the same time in a more comfortable rate of fresh air flow. So that in other types of operation, no outwardly directed air flow can occur through this pipe, a return valve is disposed in the pipe or at its end.

In order to be able to obtain a sufficient heat output also in the case of lower outside temperatures during a normal heating operation without the aid of the air-conditioning unit, it is advantageous according to preferred embodiments to provide a pipe extending from the passenger and/or utility space, preferably from the pressure side in front of the evaporator to the intake side of the fan delivering fresh air, through which circulating air is added, as required.

In a further development of the invention, the adjusting device is constructed as a four-way guide in the form of a flap which, in regard to the drive and space, results in significant advantages.

The engine cooling is aided when, during an extensive cooling operation of the passenger and/or utility space, the heat exchanger is acted upon by an engine coolant.

Further objects, features, and advantages of the present invention will become more apparent from the following description when taken in connection with the accompanying drawings which shows, for purposes of

DETAILED DESCRIPTION OF THE DRAWINGS

Figure 1:
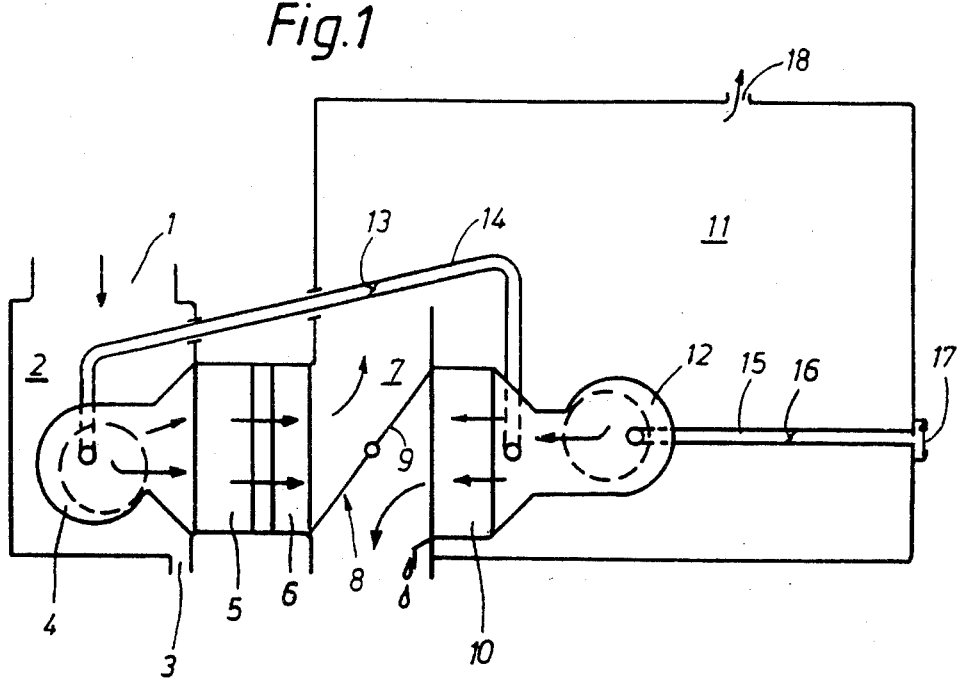
FIG. 1 is a schematic representation of a vehicle air-conditioning system constructed in accordance with a preferred embodiment of the invention schematically showing the air path at maximum heat output.

According to the diagrammatic views, fresh air enters into an air space 2 through an inlet opening 1. At its lowest point, air space 2 is provided with a drain 3 for removing separated moisture. A fan 4 is disposed in the air space 2 and is selectively operable in order to increase the rate of air flow. The delivered fresh air first flows through a condenser 5 of a compression-type air-conditioning unit and then through a heat exchanger 6 which, in a manner that is not shown, is operably connected to the colling-water or motor oil cycle of an internal-combustion engine for exchanging heat between the fresh air and the cooling-water or motor oil.

The outflowing fresh air from heat exchanger 6 next reaches a guide chamber or conduit 7 where an adjusting device 8 is located which is constructed as a four-way guide in the form of a pivotal flap 9. Evaporator 10 that is part of the compression-type air-conditioning unit is arranged on the side of the chamber 7 that is opposite the heat exchanger 6. The outgoing or re-circulating air from passenger and/or utility space 11 flows through the evaporator 10 with a flow rate of which can be selectively increased by fan 12 connected in series to and upstream of the evaporator 10.

When looking in the flow direction, there is a pipe 14 located upstream of the evaporator 10 and leading to the intake side of the fan 4. Pipe 14 includes a selectively operable closing flap 13. A pipe 15 extends from the intake side of the fan 12 to the outside of the passenger or utility space 11 and return valve 17 is provided in pipe 15 at the wall of space 11. Pipe 15 also preferably has a selectively operable adjusting flap 16. An opening is symbolically indicated by reference number 18 which represents the sum of the often not completely avoidable escape points at doors and windows through which air from space 11 penetrates to the outside. The compression type air conditioning unit with condenser 5 and evaporator 10 described herein is of otherwise conventional construction.

In the operational state of maximum heat output—as shown in FIG. 1—the fans 4 and 12 as well as the air-conditioning unit are switched on. The outgoing air flow from space 11, which is led through the evaporator 10 and flows out completely into the atmosphere, supplies an essential proportion of its heat energy to the evaporator 10 which is then available at the condenser 5—increased by the heat energy taken in by the compressor—for the heating of the fresh air flow from air space 2 before it enters the heated heat exchanger 6. The condensate occurring in the evaporator 10 is removed completely. The pipes 14 and 15 are closed so that during this mode of operation, heating takes place with fresh air from air space 2 only and there is hardly any danger that visibility to the outside is impaired by condensation on cold windows or the like.

Figure 2:
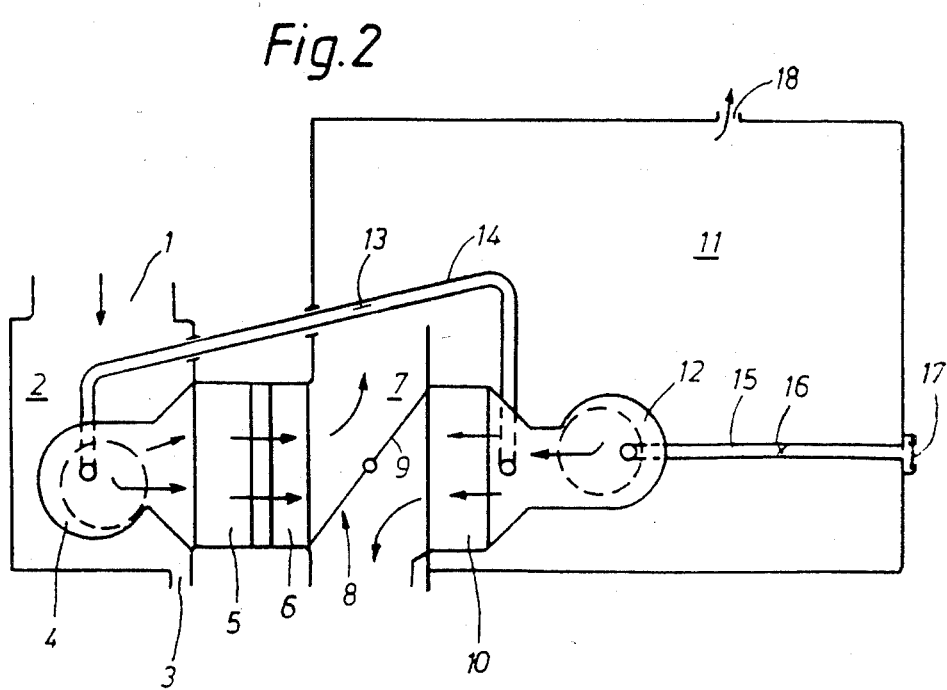
FIG. 2 is a view of the system of FIG. 1, schematically showing the air path during normal heating and during cooling operations.

During the heating at outside temperatures that are not very low and during ventilation—as shown in FIG. 2—the fan 4 is switched on selectively, while the fan 12 remains largely switched off. The air-conditioning unit is not in operation so that the heat output is only the result of the heat exchanger 6, in which case the regulating of the heat, in a known manner, may take place either downstream or upstream of exchanger 6. As in the case of extensive heating described in the preceding paragraph, all air flowing through the evaporator 10 flows to the outside while heating takes place with pure fresh air via air space 2 or with a certain proportion of circulating air which is added to the fresh air and which is led through the pipe 14. However, in the case of this mode of operation, the pipe 15 is closed.

During the ventilating operation (FIG. 2), the heat exchanger is not heated, and the flap 13 in line 14 is closed so that only fresh air reaches the passenger or utility space 11.

Figure 3:
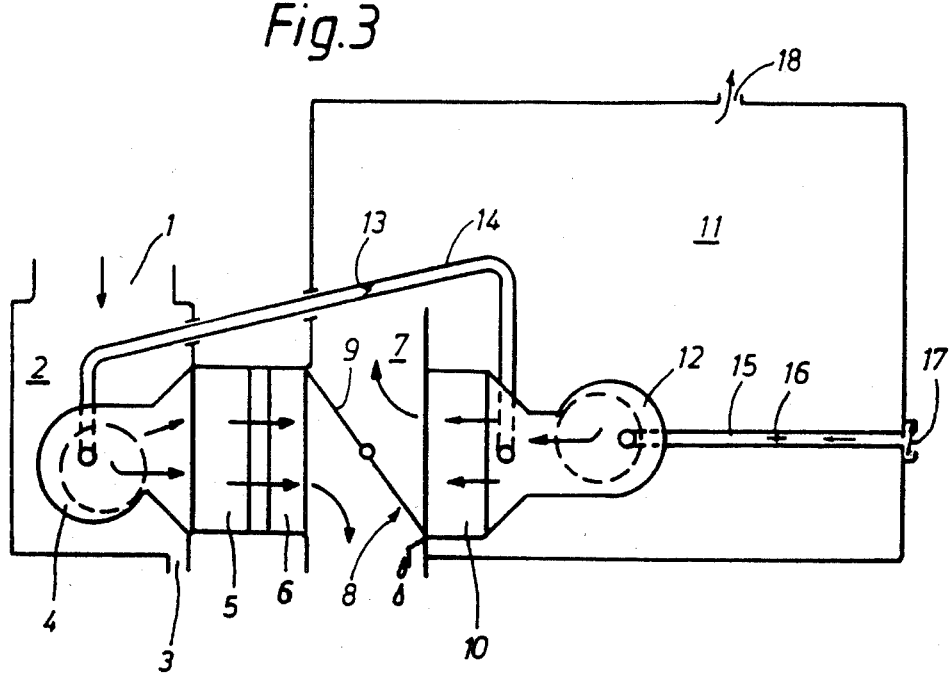
FIG. 3 is a view of the system of FIG. 1, schematically showing the air path during extensive cooling.

The air guidance in the case of an extensive cooling operation is shown in FIG. 3. In addition to the air-conditioning unit, the fans 4 and 12 are also switched on, and the space 11 air which is cooled in the evaporator 10 along with a certain amount of fresh air added via pipe 15 is returned to the passenger or utility space 11. The condensate occurring in the evaporator 10 is removed so that the windows of space 11 remain free of fogging or icing. Since the whole fresh air current that is led through the condenser 5 and the heat exchanger 6 flows back into the open outside air, it is possible in the case of this operational state to use the heat exchanger 6 to aid the engine cooling so that the heat exchanger (not shown) used for the cooling of the internal-combustion engine may have smaller dimensions.

Figure 4:
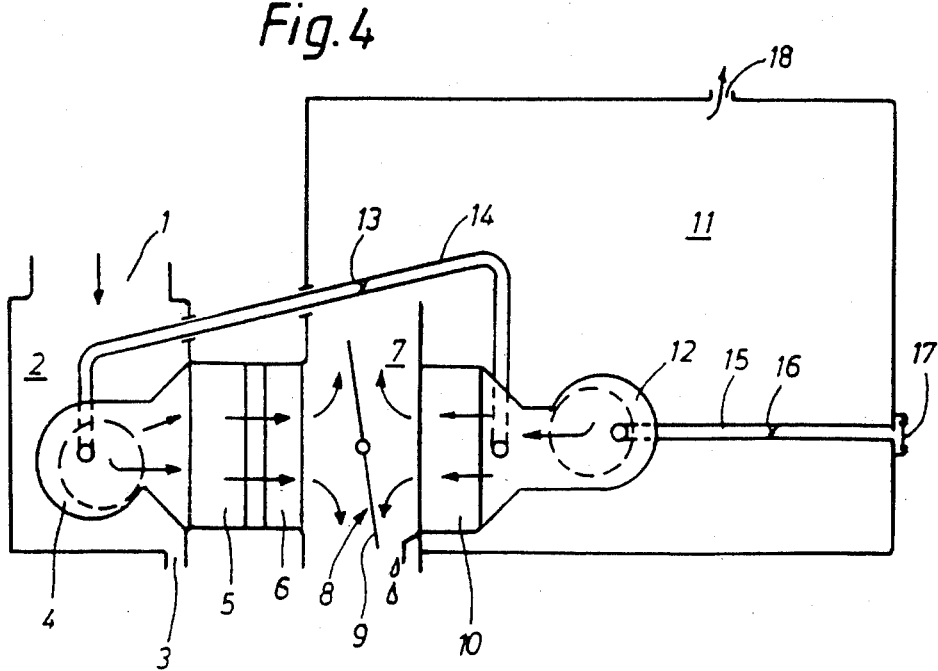
FIG. 4 is a view of the system of FIG. 1, schematically showing the course of the air flow during the drying operation.

During the drying operation which is shown in FIG. 4, the fans 4 and 12 are switched on, and the air-conditioning unit is in operation. The pipes 14 and 15 are closed, and the flap 9 takes up an approximately central position resulting in a division of the fresh air and the outgoing air flow. The space 11 air flowing through the evaporator 10 is cooled there and its moisture is largely removed there, whereas the ingoing air is heated in the condenser 5 so that on the side of the outlet, still in the shaft or chamber 7, there is a mixing of heated fresh air and cooled circulating air.

By connecting the heat exchanger 6, the fresh air can be heated further so that even if the proportion of cooled and de-humidified circulating air is high, comfortable temperatures can still be reached inside the space.

While we have shown and described several embodiments in accordance with the present invention, it is understood that the same is not limited thereto but is susceptible to numerous changes and modifications as would be known to those skilled in the art of the present disclosure and we therefore do not wish to be limited to the details shown and described therein but intend to cover all such changes and modifications as are encompassed by the scope of the appended claims.

What is claimed is:

1. A system for heating a utility space such as a passenger space of a vehicle, the system comprising:

air inlet means for conducting fresh incoming air from a first source of air to the utility space, air outlet means for conducting outgoing air from the utility space to the outside atmosphere, a heat exchanger unit disposed in the air inlet means and connected to a cycle that exchanges heat with an engine of the vehicle, a compression-type air-conditioning unit including an evaporator unit disposed in the air outlet means, a condensor unit disposed in the air inlet means to lie upstream of the heat exchanger unit to aid selectively the heating of the fresh incoming air, and refrigeration line means for transferring heat from the evaporator unit to the condensor unit, recirculatd air pipe means for selectively conducting outgoing utility space air from a point in the air outlet means upstream of the evaporator unit to a point in the air inlet means upstream of the condensor unit and the heat exchanger unit to mix at least a certain portion of the utility space outgoing air with the fresh incoming air to provide an air mixture, and an air stream directing means disposed intermediate the air outlet means and the air inlet means for separably and selectively directing the air streams from the air outlet means and the air inlet means into the utility space and the atmosphere, said air stream directing means including means for selectively operating the system to operate in at least:

a regular heat condition with the air conditioning unit disabled and the recirculating air pipe means operating so that the air mixture is heated by the heat exchanger unit when the atmospheric temperature outside of the vehicle is low, and a maximum heat condition with the air conditioning unit operating and the recirculating air pipe means disabled so that only the incoming air is heated sequentially by the condensor unit and the heat exchanger unit when the atmospheric temperature outside of the vehicle is unusually low.

2. A system according to claim 1, wherein said air stream directing means includes a four-way guide in the form of a pivotal flap disposed in an air guide chamber intermediate the air outlet means and the air inlet means.

3. The system of claim 1, wherein the recirculating air pipe means includes valve means for regulating the flow of air through the pipe means, the valve means being movable between an open position to permit air to be conducted through the pipe means during the regular heat condition and a closed position to block the flow of air through the pipe means during the maximum heat condition.

4. A system according to claim 1, wherein said air stream directing means includes means for selectively operating the system in a dehumidifying condition with the air conditioner operating, incoming air flowing sequentially through the condensor unit and the heat exchanger unit to provide a current of heated air, inside utility space air flowing through the evaporator means to provide a current of cooled air, the air stream directing means operating to divide the current of heated air into a heated portion conducted toward the utility space and a remaining portion vented to the atmosphere and to divide the current of cooled air into a cooled portion conducted toward the utility space and a remaining portion vented to the atmosphere.

5. A system for heating, ventilating, and cooling a utility space such as a passenger space of a vehicle, the system comprising:

air inlet means for conducting air from a first source of air to the utility space as incoming fresh outside air, air outlet means for conducting air away from the utility space, a heat exchanger unit disposed in the air inlet means and connected to a cycle that exchanges heat with an internal combustion engine of the vehicle, a compression-type air-conditioning unit including an evaporator unit disposed in the air outlet means, a condensor unit disposed in the air inlet means intermediate the first source of air and the heat exchanger unit, and refrigeration line means for transferring heat from the evaporator unit to the condensor unit, and an air stream directing means disposed intermediate the air outlet means and the air inlet means for separably and selectively directing the air streams from the air outlet means and the air inlet means into the utility space and the atmosphere, said air stream directing means including means for selectively operating the system to operate in at least:

a cooling condition with the air conditioning unit operating and incoming air flowing sequentially through the condensor unit and the heat exchanger unit back to outside atmosphere and with inside utility space air flowing sequentially through the evaporator unit and back to the utility space, and a maximum heating condition with the air conditioning unit operating and the evaporator cooled outlet air communicated away from the utility space and at least a portion of the heat energy content of the outgoing air from the utility space being transferred to the incoming air in the air inlet means via the refrigeration line means and the condensor unit to aid the heating of the incoming air.

6. A system according to claim 5, wherein, in the operating condition with extensive cooling of the utility space, the heat exchanger is acted on by an engine coolant.

7. A system according to claim 5, wherein said air stream directing means include means for selectively operating the system in a dehumidifying condition with the air conditioner operating, incoming air flowing sequentially through the condensor unit and the heat exchanger unit to provide a current of heated air, inside utility space air flowing through the evaporator means to provide a current of cooled air, the air stream directing means operating to divide the current of heated air into a heated portion conducted toward the utility space and a remaining portion vented to the atmosphere and to divide the current of cooled air into a cooled portion conducted toward the utility space and a remaining portion vented to the atmosphere.

8. A system according to claim 5, wherein said air stream directing means includes a four-way guide in the form of a pivotal flap disposed in an air guide chamber intermediate the air outlet means and the air inlet means.

9. A system according to claim 8, wherein, in the operating condition with extensive cooling of the utility space, the heat exchanger is acted on by an engine coolant.

10. A system according to claim 5, wherein a selectively operable inlet fan is arranged at the air inlet means upstream of the condenser unit for increasing the inflow of fresh outside air, and wherein a selectively operable outlet fan is arranged at the air outlet means for increasing the outflow of recirculating air flow and which, in addition to cooling and drying operations, is also usable during an extensive heating and ventilating operation.

11. A system according to claim 10, wherein a recirculating pipe means extends from the utility space to the intake side of the inlet fan for selectively supplying circulating air to the air inlet means.

12. A system according to claim 11, wherein the recirculating pipe means is connected to the recirculating air flow from the utility space at the pressure side of the evaporator.

13. A system according to claim 12, wherein said air stream directing means includes a four-way guide in the form of a pivotal flap disposed in an air guide chamber intermediate the air outlet means and the air inlet means.

14. A system according to claim 10, comprising a fresh air pipe means communicating fresh air from outside the utility space directly to the air outlet means, whereby an amount of fresh air that maintains a certain internal pressure level is guided to the inlet side of the outlet fan returning circulating air.

15. A system according to claim 14, wherein a return valve is disposed in the fresh air pipe means.

16. A system according to claim 14, wherein said air stream directing means includes a four-way guide in the form of a pivotal flap disposed in an air guide chamber intermediate the air outlet means and the air inlet means.

17. A system according to claim 14, wherein, in the operating condition with extensive cooling of the utility space, the heat exchanger is acted on by an engine coolant.

* * * * *

UNITED STATES PATENT AND TRADEMARK OFFICE
CERTIFICATE OF CORRECTION

PATENT NO. : 4,566,531

DATED : January 28, 1986

INVENTOR(S) : Albert Stolz

It is certified that error appears in the above-identified patent and that said Letters Patent is hereby corrected as shown below:

Column 3, Line 29: The word "colling-water" should be "cooling-water".

Signed and Sealed this

Twenty-second Day of July 1986

[SEAL]

Attest:

DONALD J. QUIGG

Attesting Officer

Commissioner of Patents and Trademarks